United States Patent
Hylbert et al.

(10) Patent No.: US 10,144,119 B2
(45) Date of Patent: Dec. 4, 2018

(54) PRECISION CONNECTIONS AND METHODS OF FORMING SAME

(71) Applicant: UCT Additive Manufacturing Center Pte. Ltd., Singapore (SG)

(72) Inventors: Jon Hylbert, Los Gatos, CA (US); Alexi Petrof, San Francisco, CA (US); Michael Stathopoulos, Livermore, CA (US); Bruce Wier, San Jose, CA (US)

(73) Assignee: UCT Additive Manufacturing Center Pte. Ltd., Singapore (SG)

( * ) Notice: Subject to any disclaimer, the term of this patent is extended or adjusted under 35 U.S.C. 154(b) by 0 days.

(21) Appl. No.: 15/335,508

(22) Filed: Oct. 27, 2016

(65) Prior Publication Data
US 2017/0120429 A1    May 4, 2017

Related U.S. Application Data

(60) Provisional application No. 62/247,532, filed on Oct. 28, 2015.

(51) Int. Cl.
*G01L 5/00* (2006.01)
*B25B 23/142* (2006.01)
(Continued)

(52) U.S. Cl.
CPC .......... *B25B 23/1425* (2013.01); *B25B 13/08* (2013.01); *B25B 23/14* (2013.01);
(Continued)

(58) Field of Classification Search
CPC . B25B 23/1425; F16L 19/0218; G01L 5/0042
(Continued)

(56) References Cited

U.S. PATENT DOCUMENTS

| 759,948 A | 5/1904 | Weston |
|---|---|---|
| 3,521,910 A | 7/1970 | Callahan, Jr. et al. |

(Continued)

FOREIGN PATENT DOCUMENTS

| FR | 2972255 A1 | 9/2012 |
|---|---|---|
| TW | M391444 U | 11/2010 |
| WO | 2015130427 A1 | 9/2015 |

OTHER PUBLICATIONS

PCT International Search Report and Written Opinion dated Feb. 13, 2017, for International Application No. PCT/US2016/058987.
(Continued)

*Primary Examiner* — Max Noori
(74) *Attorney, Agent, or Firm* — Patterson + Sheridan, LLP

(57) ABSTRACT

A wrench and method of using the wrench to properly make up threaded connections is provided. The wrench includes at least a strain gauge coupled thereto, such that when the wrench is used to turn one part of a threaded connection, the strain associated with different states of the making up of the connection is monitored, to establish a baseline condition after which the one part of the threaded connection is turned an additional number of degrees, turns, or fractions of a turn. The wrench and method may be used to make up fluid tight connections, where previously the threaded parts were finger tightened, followed by turning thereof an additional number of degrees, turns, or fractions of a turn.

8 Claims, 8 Drawing Sheets

(51) Int. Cl.
 *B25B 13/08* (2006.01)
 *B25B 23/14* (2006.01)
 *F16L 19/02* (2006.01)
 *F16L 19/025* (2006.01)
 *G01L 5/24* (2006.01)

(52) U.S. Cl.
 CPC ......... *F16L 19/025* (2013.01); *F16L 19/0218* (2013.01); *G01L 5/0042* (2013.01); *G01L 5/24* (2013.01)

(58) Field of Classification Search
 USPC ...................................................... 73/862.21
 See application file for complete search history.

(56) References Cited

U.S. PATENT DOCUMENTS

| | | | | |
|---|---|---|---|---|
| 4,208,775 | A * | 6/1980 | McCombs | E21B 19/166 173/182 |
| 5,547,229 | A | 8/1996 | Eidsmore | |
| 6,341,544 | B1 * | 1/2002 | Falzone | B25B 13/44 81/128 |
| 6,499,358 | B1 * | 12/2002 | Hogan | B25B 23/1427 73/862.21 |
| 7,207,605 | B2 * | 4/2007 | Olechnowicz | F16L 19/005 285/328 |
| 2001/0040378 | A1 * | 11/2001 | Babuder | F16L 19/0218 285/328 |
| 2006/0005637 | A1 * | 1/2006 | Hirai | B25B 21/00 73/862.21 |
| 2006/0064071 | A1 * | 3/2006 | Bonnette | A61M 25/09 604/500 |
| 2010/0000380 | A1 | 1/2010 | Richardson | |
| 2010/0199782 | A1 | 8/2010 | Hsieh | |
| 2010/0265097 | A1 * | 10/2010 | Obatake | B25B 21/00 340/870.4 |
| 2011/0185863 | A1 | 8/2011 | Hsieh | |
| 2012/0006161 | A1 * | 1/2012 | Chen | B25B 23/1425 81/479 |
| 2014/0020953 | A1 * | 1/2014 | Chau | E21B 44/00 175/25 |
| 2015/0209787 | A1 * | 7/2015 | Brann | G01N 30/461 29/469 |

OTHER PUBLICATIONS

Taiwan Patent Application No. 105135070, Official Letter from TIPO dated Oct. 31, 2017, 14 pages.

* cited by examiner

PRECISION CONNECTIONS AND METHODS OF FORMING SAME

BACKGROUND OF THE INVENTION

Field of the Invention

The present invention relates to the connection of fittings used in the transport of fluids, including toxic gases and liquids. More particularly, the present invention relates to the connection of fittings having mating glands, wherein misalignment of the glands or of a gasket interposed therebetween can lead to unintentional and often dangerous inaccurate tightening of the mating nuts of the connection, resulting in an over tightened or under-tightened condition and thus under-compression or over-compression of the gland to gasket or gland to gland interfaces, which can result in leakage of the fluids flowing therethrough.

Description of the Related Art

Piping used to transport fluids and gases often include fittings, wherein a sealing gland of the fitting is attached to one end of a segment of fluid piping such as by welding it thereto, and a mating gland is similarly attached to a second segment of fluid piping. The glands are then brought together in facing relationship with the fluid passages thereof aligned, and a fastener such as a female nut surrounding the first gland and rotatable with respect thereto, and a male nut surrounding the second gland and rotatable with respect thereto, are tightly threaded together to form a sealed fluid connection with the male threaded portion received in a threaded recess in the female nut. In some applications, a ring shaped gasket is interposed between the first and second glands before the nuts are connected.

One issue with connecting gland base fittings is ensuring that the connection is sealed by compression of mating sealing parts such as the glands and gasket, but that the nuts are not overtightened and thus the sealing parts are not over-compressed. If the threaded nuts are not tightened sufficiently, the connection may leak. If the nuts are overtightened, the connection can fail, i.e., be or start leaking, due to stress induced in the nuts, the gland, the gasket, or in the piping or in the weld of the piping to the gland attached thereto, or make it difficult to open the fitting without damaging the nuts or gland if the fitting needs to be removed for servicing of a component or equipment to which it is connected.

The fittings are used, as among other applications, to connect gases and liquids used in industrial applications from a gas or liquid source to a use location thereof, such as an industrial machine. These fluids are often corrosive, pyroforic and/or toxic. If the components of the fitting, or the piping welded thereto, are overstressed or over-compressed as a result of overtightening of the nuts, the fitting may leak or cause the adjacent weld to be stressed, leading to stress corrosion cracking of the piping or welded connection. If the nuts are inadequately tightened, the fitting may leak, leading to evacuation of a manufacturing facility, personal injury, and damage to equipment and facility, including the risk of fire.

To ameliorate the incidence of over or under-tightening of the nuts, a paradigm of tightening the nuts together by a certain number of revolutions or fractions of a revolution following "finger tightening" of the nuts to a "finger tight" condition is employed. Finger tightening is considered turning one nut, or both nuts, relative to the other nut to the maximum amount possible using ones' fingers. Thereafter, a hand tool such as a hand held wrench is employed to execute the subsequent number, or fraction of a number, of revolutions of one nut relative to the other. The number of, or fraction of, revolutions following achieving the "hand tight" condition is often specified by the manufacturer of the fitting, or the end user of the connection. However, different individuals have different ideas of what finger tight is, and different abilities to finger apply the torque needed to turn one nut relative to the other, and thus overtightening and under-tightening of the nuts of the connection, with the issues related thereto, continue to occur. Additionally, different individuals may exceed or fail to apply the desired number of turns or fraction thereof specified by the end user after finger tightening is achieved, also resulting in overtightening and under-tightening of the nuts of the connection, with the issues related thereto To further complicate finger tightening, a gasket is typically disposed between the glands being pulled together by the nuts to form the sealed fitting connection. In this connection, the face of each gland, or a projection from the face of the gland, presses against the gasket, squeezing and compressing the gasket therebetween to form a gland to gasket to gland sealed connection. However, the presence of the gasket can increase the incidence of fittings being under or overtightened. As the glands are brought together by the relative threaded rotation of the nuts, the gasket will be encountered by one or both of the nuts. If the gasket or the glands are slightly cocked within the envelope of the partially connected nuts, or are hung up therein, the nuts can become hard to turn because one or both of the glands are contacting the gasket, but only a portion of the gasket is contacting the glands, resulting in the nuts being perceived as in the finger tight condition. During manufacturing of a fluid-using product, multiple sections of piping are interconnected, and as a result of tolerance stacking and other potential misalignments, the glands may be sufficiently close to thread the nuts together, but remain spaced apart within the envelope of the nuts, or offset within the envelope of the nuts, to the point where the assembler can no longer turn them using their fingers, resulting in a non-finger tight connection at that point. The offset can be radial, i.e. one gland is initially slightly to the side of the other, or the offset can be non-parallelism of the seating faces of the glands, or spaced apart, i.e., where a gap is present between the glands about their circumference which is greater than the thickness of the gasket, or a combination thereof. Thus, although the assembler believes the connection is in a finger tight condition, the subsequent rotation thereof with a wrench by a certain degrees of rotation specified once the connection is hand tight will under-tighten the connection. On the other hand, if the assembler knows that the connection can yield an inaccurate finger tightened condition, they may compensate by increasing the degrees of rotation of the nuts. If the nuts were properly made up finger tight, the fitting nuts will be overtightened when the post finger tightening rotation is performed.

SUMMARY OF THE INVENTION

A method of repeatably tightening connections to a desired tightness, and an apparatus therefor, are provided. The apparatus includes, in one embodiment, a wrench capable of monitoring the strain on the body of the wrench used to tighten the nut(s) of the fitting, to determine when the glands are in full contact with each other, or in full contact with a gasket interposed therebetween, as an indication of finger tightness thereof, after which the nut(s) is turned an additional required number of degrees as specified for the connection. The strain on the wrench is correlated to different conditions of alignment of the fitting connection parts. Thus, the strain at a location on the wrench is correlated to the full gland contact condition, to enable a user to determine the point at which continued rotation is required, thus eliminating the manual, user specific, finger tight standard and providing a mechanical standard for full contact.

In another aspect, the wrench is enabled to read the strain via an electronics package thereon to indicate that the finger tightened condition has been achieved, and thereafter, using an internal gyro, indicate to the user when the desired further number of turns (or fractions of turns) or degrees of relative rotation of the nut(s) have been reached. In a further aspect, the wrench may include an indicator of finger tightness such as a visual, physical or audible signal, after which the user can manually turn the nut(s) by the additional number of degrees using the wrench, or a different wrench. Alternatively, the visual or audible signal can be provided at full gland contact (finger tightened) and final tightened states, or a changing signal, such as different colors, different rates of flashing of a visual indicator, or increased or decreased frequency of an audio tone or beat may be actuated upon reaching finger tightening and continued until the final tightening condition is achieved. Two wrenches, wirelessly linked, and each having the capability to determine the strain thereon and the relevant rotation, may be used simultaneously, one turning each one of a pair of nuts being tightened together.

In a method of connecting fittings at the ends of two different piping sections or a section of piping and a plug, the glands are brought close enough together, with the gasket therebetween, such that the threads of the male nut (outer diameter threads) are received within the threads of the female nut, and turned to establish a threaded connection therebetween, on the order of one or less than one relative rotation, to ensure that the threads on the nuts are engaged with one another. Thereafter, a single wrench, or two wrenches, one for each of the male and female nuts, which may be used to at least secure one nut against rotation while the other is turned, or simultaneously turn both nuts, are fitted over the nuts and the strain on the bodies of wrench(es) is monitored as the wrenches, and thus the nuts, are turned, to determine when the connection is in a hand tightened state, after which a gyro in the wrench electronics monitors further rotation and outputs a signal indication that the requisite number of turns or partial turns post finger tightening has occurred. Where two wrenches are employed simultaneously to tighten a fitting connection, they may be hard wired to each other, or may wirelessly interact with one another or with a separate control device, that maintains the electronics package other than the strain and gyro sensors, and outputs a signal indicating at least correct tightening of the fittings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A wrench hereof is provided for the tightening of the threaded connections of fittings, which is used to ensure that the desired degree of tightness of the nuts of a fitting can be accurately and repeatably obtained without the use of an arbitrary standard, such as finger tightened followed by a certain number, or fraction of numbers, of turns. The description hereof is provided with respect to a specific fitting, having opposed glands and an intervening gasket therebetween, but the wrench and method of tightening connections for fluid piping described herein is not limited to such a connection fitting. A single wrench can be used to tighten the fitting, although in many cases, two wrenches are needed. In the two wrench configuration, both wrenches can rotate the nuts, or one can hold one nut stationary while the other turns the other nut.

Figure 1:
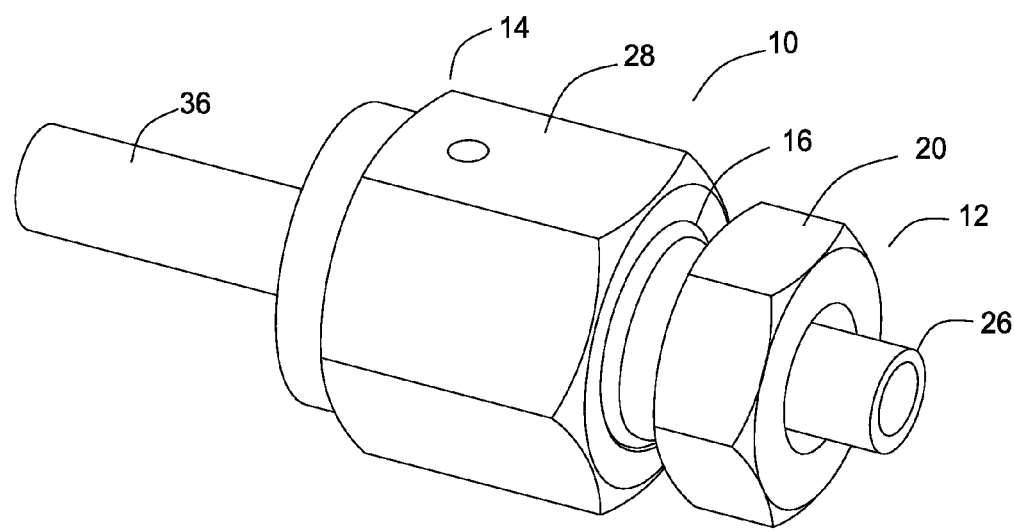
FIG. 1 is a perspective view of an assembled fitting.
Figure 2:
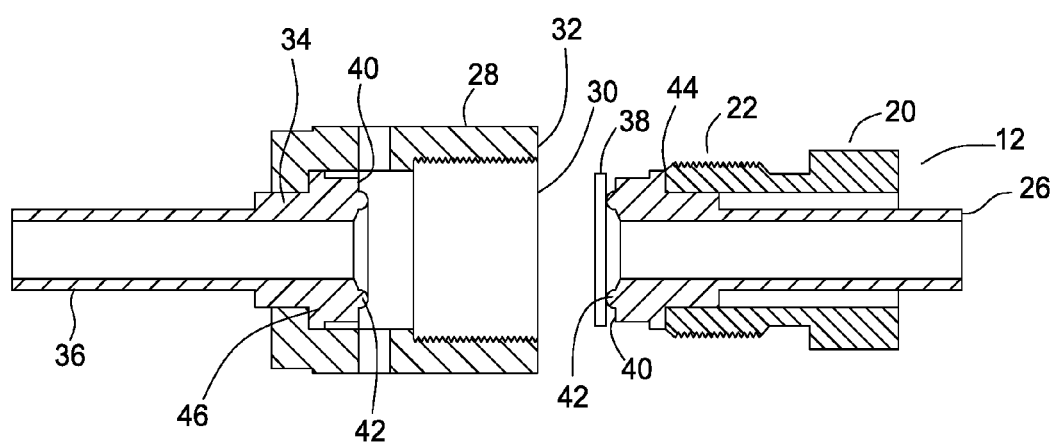
FIG. 2 is an exploded view of the fitting of FIG. 1, showing the nuts, gasket and glands of the fitting.
Figure 3:
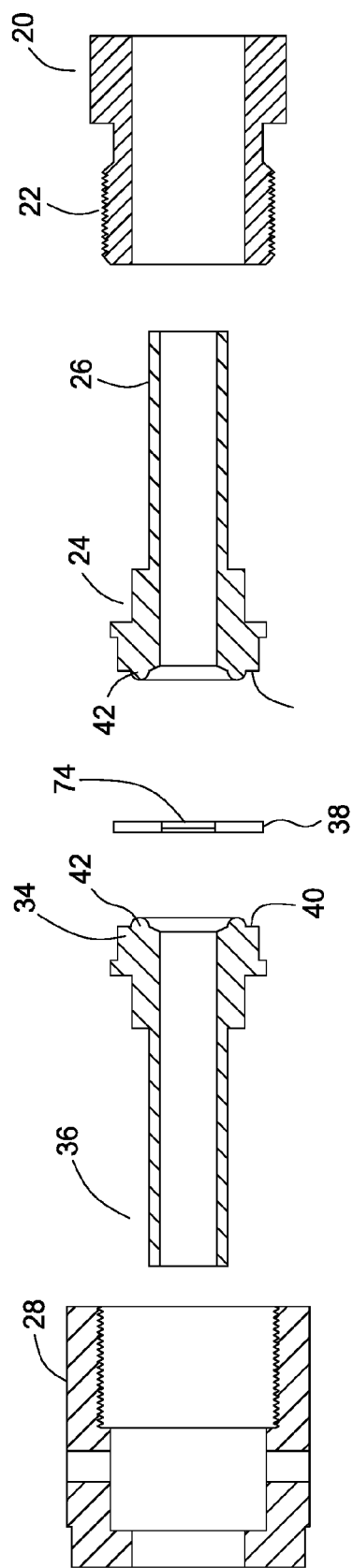
FIG. 3 is an exploded view of the fitting of FIG. 1, showing the gasket positioned against the male side gland, and the female and male glands received within the male and female nuts, respectively.

Referring initially to FIGS. 1 to 3, a fitting 10 comprising a VCR connection available from Swagelok® includes a male portion 12 and a female portion 14 which are connected at a threaded connection 16. Male portion 12 includes an annular nut 20 having a male threaded extension 22 extending over a first internal gland 24 from which a first section of piping 26 extends through an internal bore of the male portion and outwardly of the rear side thereof. Female portion 14 includes a female annular nut 28 having an inwardly projecting bore 30 having threads 32, mating with the threads on male threaded extension 22, and a second gland 34 received within the projecting bore 30 from which a second section of piping 36 extends outwardly of the rear side of the female portion 14. The sections of piping 26, 36 are typically welded to the glands 24, 34. A gasket 38 having a central bore extending therethrough is received within the threaded bore 30, and between the opposed first and second glands 24, 34, when the connection has been, or is being, "made up". Each of the first and second glands 24, 34 include an engagement face 40, from which a circular, generally semicircular in cross section, projection 42 extends. A metal to metal seal may be effectuated by compressive contact of the projections 42 with opposed sides of the gasket 38 once the nuts 22, 28 are properly threaded together. Fluid communication through the fitting 10 occurs via the piping 26, 36, the internal bores of the glands 24, 34, and the central through bore 74 of the gasket 38.

To make up a connection, the gasket 38 is typically placed into the bore 30 of the female portion 14, putatively against the circular projection 42 on the engagement face 40 of the second gland 34, and then the male portion 12 with the first gland 24 received therein such that the first piping 26 extends out the rear side thereof is brought into contact with the female portion 14, such that the threads on the male threaded extension 22 engage with the threads 32 in the bore 30, and the nuts 20, 28 are rotated with respect to one another to tighten the connection such that a rear side flange 44, 46 on the nuts 20, 28 bear against the non-projection 42 sides of each of the glands 24, 34. Typically, the female nut 28 is tightened while the male nut 20 is held stationary, but both nuts 20, 28 can be rotated simultaneously. Both the piping 26 extending from the male portion 12 and the piping 36 extending from the female portion 14 may be rigidly connected to another element of the equipment being assembled, only one section of piping may be rigidly connected to another element of the equipment being assembled, or neither section of piping is previously assembled into the equipment. For example, during manufacture of an item of equipment, individual tubing "runs" having a defined length based on the equipment design, and fittings, including the glands and nuts, are welded to the opposed ends of the piping. To fit the piping into the equipment, the piping may include a number of bends therein, to route it around components of the equipment or other piping, etc.

Figure 4:
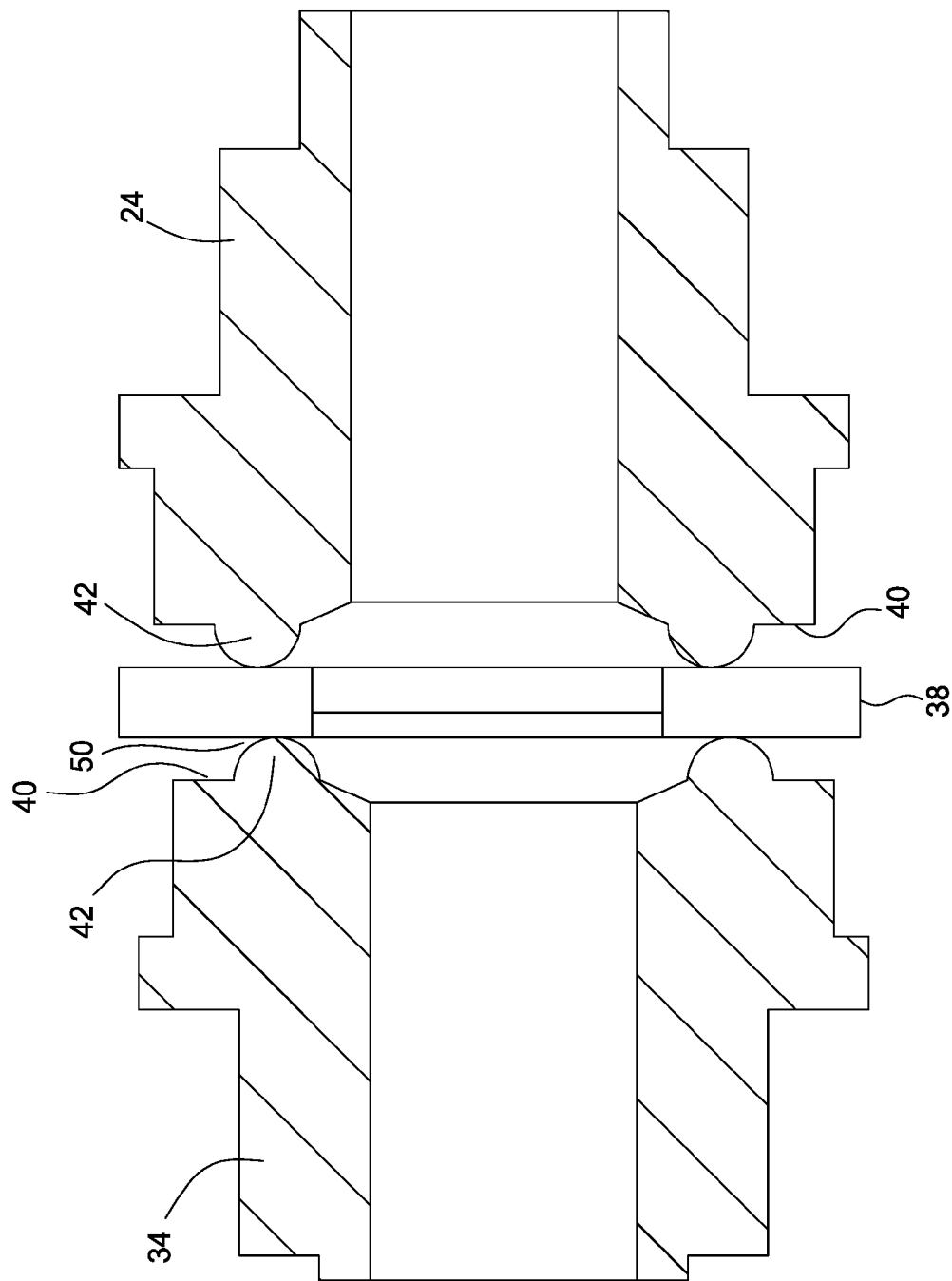
FIG. 4 is a sectional view of the fitting of FIG. 1 during assembly thereof, showing a state of misalignment between the glands.

In the past, during assembly of the fitting connection, the assembler of the connection would turn at least one of the nuts 20, 28 with their fingers until they can no longer turn the nut using their fingers, known as finger tightening or finger tightened, after which the assembler applies a wrench to the nut being turned, and turns the nut an additional specified amount, for example ¼ of a turn, i.e., 90 degrees while the other nut remains stationary such as by being held by a wrench, or is also rotated in the opposite direction as the first nut using the wrench for a total relative rotation of the two nuts, for example, of ¼ turn. However, as shown in FIG. 4, the male and female portions 12, 14, the glands 24, 34 and piping connected thereto, and/or the gasket 38 can be misaligned during the initial bringing of the first and second glands 24, 34 together, which can result in the gasket 38 not fully seating against both of the opposed circular projections 42 on the opposed engagement faces 40 of the first and second glands 24, 34, and/or the gasket 38 and/or glands can become misaligned in the bore 30 or as yet to be made-up fitting 10. For example, due to minor variations in the length or bend angle of the piping, and the welding of the fitting to the piping, the glands can be radially offset from one another, the upper surface of the projections of the two glands can be in a non-parallel state to each other, and they may be longitudinally offset from one another, i.e., spaced from each other in the depth direction of the tubing. One or all of these assembly challenges can be presented to the assembler each time they make a connection. For example, in FIG. 4, the gasket 38 is fully seated against the circular projection 42 on first gland 24, but only partially seated against the circular projection 42 on second gland 34, and a small gap 50 extends between a portion of the gasket 38 and a portion of the circular projection 42 on the second gland 34. This can occur if the upper surface of the projections of the two glands are in a non-parallel state to each other. When this condition occurs, as the assembler is tightening the connection by using their fingers, the connection will appear finger tight, i.e., a false finger tight condition will be detected by the assembler because of the resistance to further tightening caused by the solid connection of the gasket to the first gland 24 and to a portion of the second gland 34 and resistance of the piping attached to the glands against movement, before the gasket 38 is fully seated against the opposed circular projections 42 on the opposed engagement faces 40 of the first and second glands 24, 34 as shown in FIG. 2. Thus, further tightening of the connection by turning one nut a certain number of turns or fractions of a turn can result in a connection where the gasket 38 is not properly seated between the opposed circular projections 42 on the opposed engagement faces 40 of the first and second glands 24, 34, or the gasket 38 and projections 42 are not in the desired compressive state around the circumference of both projections 42 and the opposed mating areas of the gasket 38. Thus, the proper compression at the projection 42-gasket 38-projection 42 interface areas will not be achieved.

Herein, this issue is solved by using a wrench 60, having a strain gauge, gyroscope, and control circuitry, to turn one of the nuts 20, 28 during assembly. In this arrangement, the nuts 20, 28 are brought together with the gasket 38 between the opposed first and second glands 24, 34, either using the wrench 60 or initially turning one of the nuts 20, 28 part or more of a full turn (full rotation) to ensure the threads are properly engaged, and then the wrench 60 is used to turn the nut 20 or 28. As the nut(s) is turned, if the gasket 38 or the facing projections 42 of the glands 24, 34 are misaligned, the strain on the wrench 60 will increase when a portion of the gasket 38 contacts portions of both glands 24, 34. If an interference occurs within the connection increasing the friction of the gasket 38 against movement in the female portion bore 30 or the glands are restricted against movement, such as by the piping connected thereto, preventing proper alignment of the projections 42 of the first and second glands 24, 34 the gasket 38, the gasket 38 will contact only portions of one or more of the projections 42 on the glands 24, 34, and the strain on the wrench will increase indicating to a user that the connection is finger tight, when it is not. If the first and second glands 24, 34 are properly aligned, the strain on the wrench will increase at a low steady rate as the surface area of the threads of the nuts 20, 28 in contact increases as they are threaded together, and then the rate of increase will change at an inflection point, indicative that the first and second glands are aligned, and the projections 42 are contacting the gasket over the full circumference thereon. Thereafter the strain will rise asymptotically as the nuts are continued to be turned in the tightening direction. This increase signals that the gasket 38 is fully seated against the circular projections 42, and thus that the glands 24, 34 are fully seated within the respective male and female portions 12, 14 of the connection. Proper determination of the fully seated condition is preferably evaluated using the derivative, or second derivative, of the strain signal compared to the number of (relative) turns of the nuts 20, 28. At this point, the wrench 60 is used to turn one of the nuts 20, 28 the requisite amount of additional, post finger tight, turns, or a requisite fraction thereof. In this way, each fitting connection is reliably tightened to the desired tightness, and the variation of the tightness of one fitting connection to another fitting connection is significantly reduced.

Figure 5:
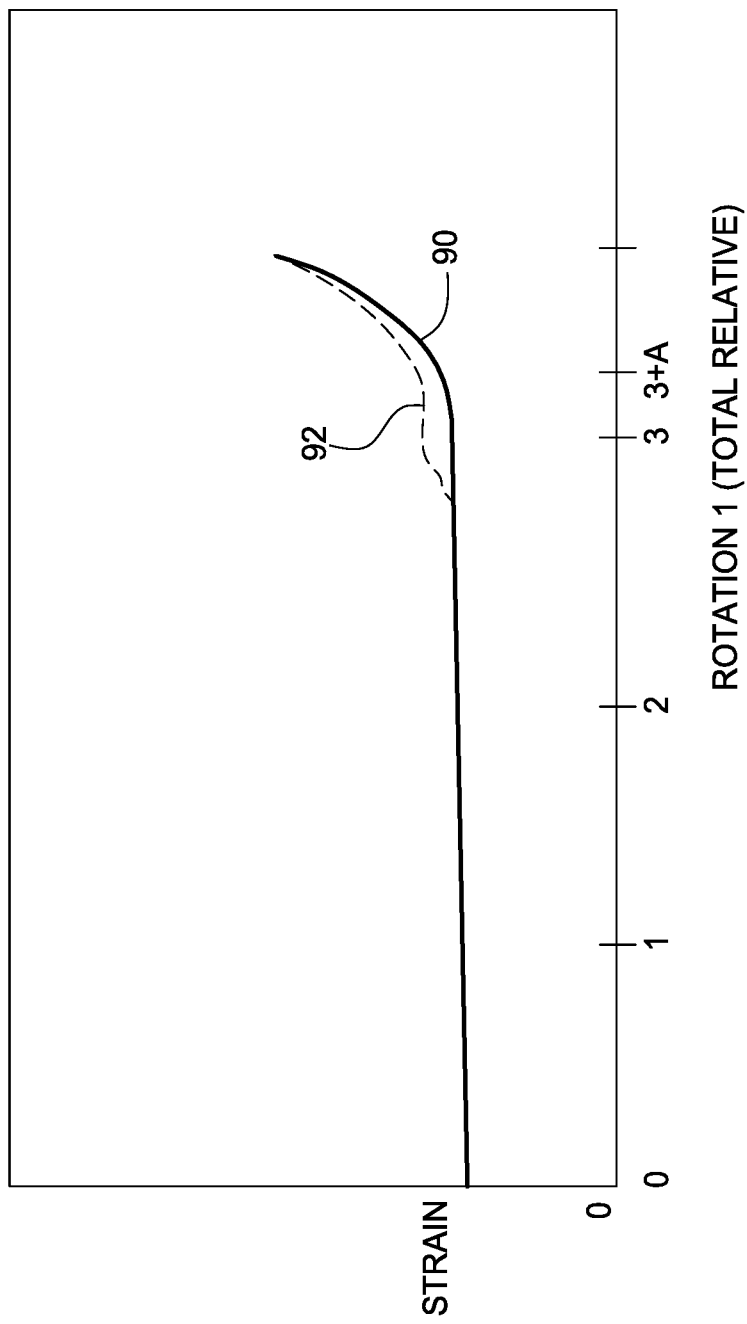
FIG. 5 is a graph of the strain on the wrench as the connection is being made up.

Referring to FIG. 5, the strain on the handle of wrench 60 in comparison to the number, or fraction of the number, of relative turns of the nuts 20, 28, is shown graphically. In the example, the total number of turns (rotations) of one nut relative to the other is greater than three, as at about three turns the connection becomes finger tight. In FIG. 5, the solid line 90 represents a condition wherein the projections 42 on the glands 24, 34 fully contact the gasket 38 before a meaningful increase in strain occurs on the wrench 60 handle. Initially, the strain on the wrench 60 handle increases at a relatively steady rate, because the contact area between the threads of the nuts 20, 28 increases as the male nut 20 enters further into the female nut 28. Then, the strain begins to increase at a different rate just after the nuts 20, 28 have been rotated a little over 3 turns with respect to each other, i.e., at 3 +A turns, indicative of a proper projection 42 to gasket 28 to projection 42 contact having occurred about the circumference of the gasket 28. Thereafter, according to an end user or customer defined specification or a manufacturers specification for the connection, one of the nuts is rotated an additional specified fraction of a turn, during which the strain on the wrench handle 60 increases as the projections 42 and/or the gasket 38 are compressed together. However, the determination of a proper make-up of the connection is determined solely by determining the point where the inflection of the strain curve occurs or using the derivative or second derivative of the strain curve in comparison to that of the curve occurring when a false "hand tight" condition is encountered, considered as the finger tight condition of the previous assembly paradigm, and rotating at least one of the nuts 20, 28 relative to the other by the specified number of turns or fraction thereof from the point where the strain began to continuously increase. Note that the logic of the wrench will often determine the point at which further rotation by a fraction or number of turns, after that point has been reached, but very quickly, on the order of less than a second. Thus, the logic circuit compares the rotation of the nut(s) after the point at which further turns are required to the required number of turns, and signals completion when that point is reached, even if a portion of that rotation occurred before the logic of the wrench determined that the point at which further required had been reached.

The dashed line 92 in FIG. 5 shows the strain on the wrench handle when a false finger tight condition is encountered by the wrench 60. In this case, the strain begins to further increase, but does not continue to increase after an initial increase is encountered, until the nuts 20, 28 are rotated with respect to one another by 3+A rotations, after which the strain continues to increase asymptotically as the nuts 22, 28 are turned with respect to one another indicating full seating of the gasket 38 with the surface of the projections 42 on both glands 24, 34. At this point, the wrench 60 is turned the required number or fraction of number of turns of one of the nuts 24, 34 relative to the other, from the point at which the continuous increase in strain began. Thus, where a condition is encountered during the tightening of the connection which would otherwise present a false finger tightened condition, the connection is still properly made up.

Figure 6:
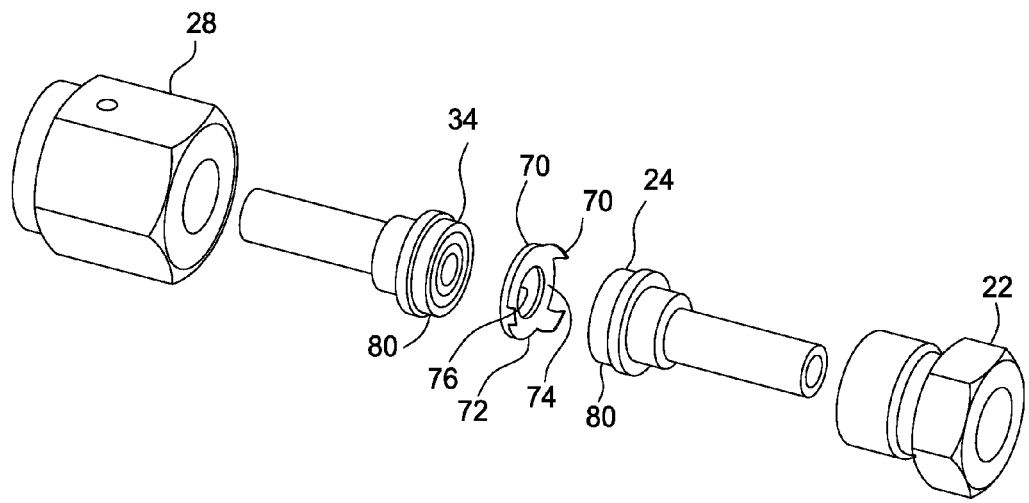
FIG. 6 is an exploded view of an additional fitting, similar to that of FIG. 3 but further including a gasket retainer therein to help locate the gasket between the facing glands during the tightening of the nuts to close the fitting.

FIG. 6 is an exploded view of an additional fitting 10 configuration. In FIG. 6, the gasket 38 is held within a retainer 70. In contrast to the generally planar opposing facies of the gasket 38, the retainer 70 has a curved, in section, surface, from which a plurality of radially inwardly projecting tabs 72 project. The retainer 70 extends annularly about a central, generally circular, opening (not shown), having an inner circumference which is larger than the inner circumference 76 of the through bore 74 of gasket 38. The gasket 38 is received against the face of the retainer 70 from which the tabs 72 project, and the sides of the tabs 72 can engage the sides of the gasket 38 to hold it in place during assembly of a connection. Each of the first and second glands 24, 34 is configured to include the circular projection 42 extending from the end faces thereof, and the retainer 70 is positioned in the connection such that the projection 42 of one of the glands 24. 34 is received against the gasket 38 held in the retainer 70, and the tabs 72 extend along the outer circumferential surface 80 of the gland 24 or 34 adjacent to the end face 40 of the gland 24 or 34, and the tabs 72 frictionally grip the outer circumferential surface 80 of the gland to maintain the gasket 38 held between the retainer 70 and gland (24 or 34) in place. The gasket 38 is thus retained against the projection 42 of one of the male and female portions 12, 14, and the retainer 70 thus ensures the radial position of the gasket 38 with respect to the projection 42 and the opening through the member 12 or 14 as the male nut 20 is run into the threaded bore 30 of the female nut 28. As where the gasket 38 is used without the retainer 70, if the gasket 38 comes into contact with both glands 24, 34 but is only in partial contact with one or both of the glands 24, 34, a false finger tight condition can be detected. This can occur, for example, when the retainer is not firmly seated against a projection 42 of one of the first and second glands 24, 34. By using the wrench 60, when the gasket 38 is properly seated is determined, and the desired number of turns or fractions thereof is applied thereafter, to ensure correct tightening and making-up of the connection.

Figure 7:
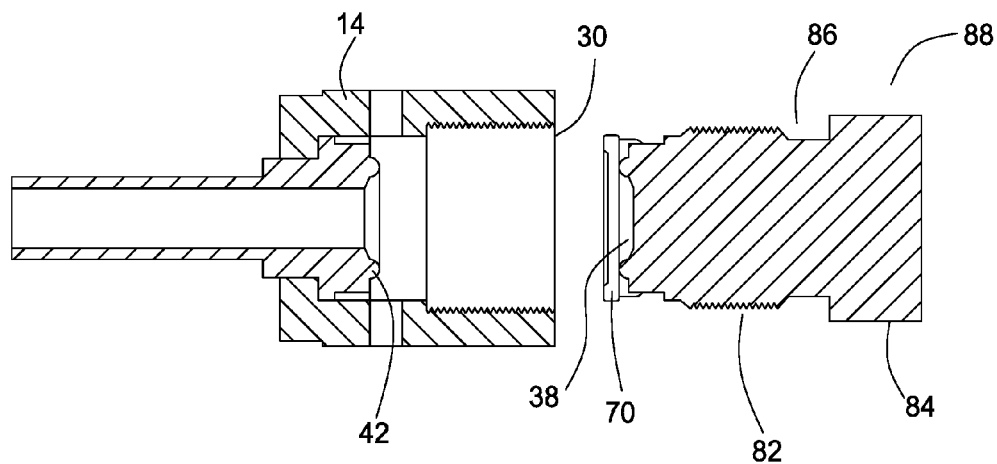
FIG. 7 is sectional plan view of a plug connecting into a female side connection.
Figure 8:
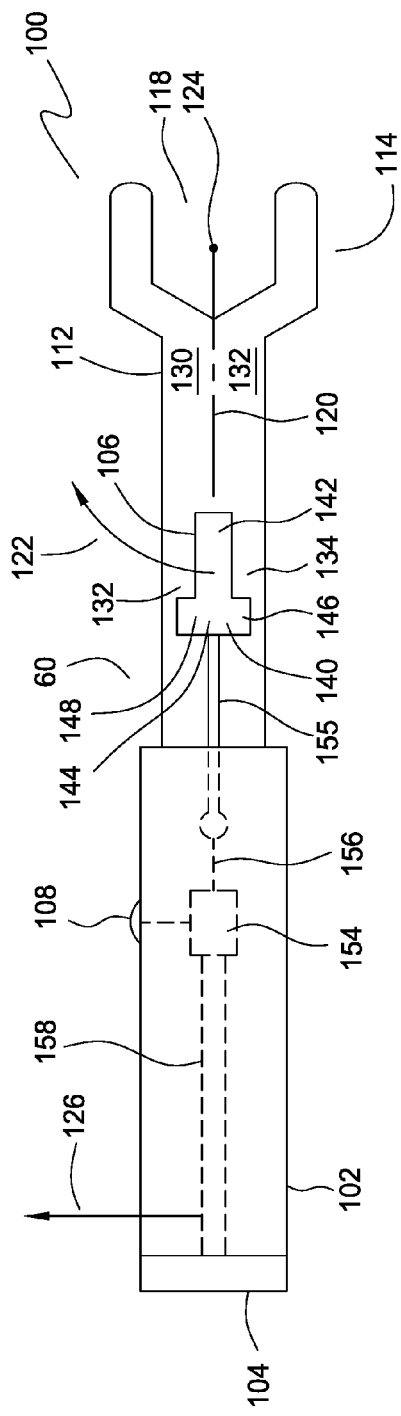
FIG. 8 is a plan view of an embodiment of the wrench used to tighten the connections hereon.
Figure 9:
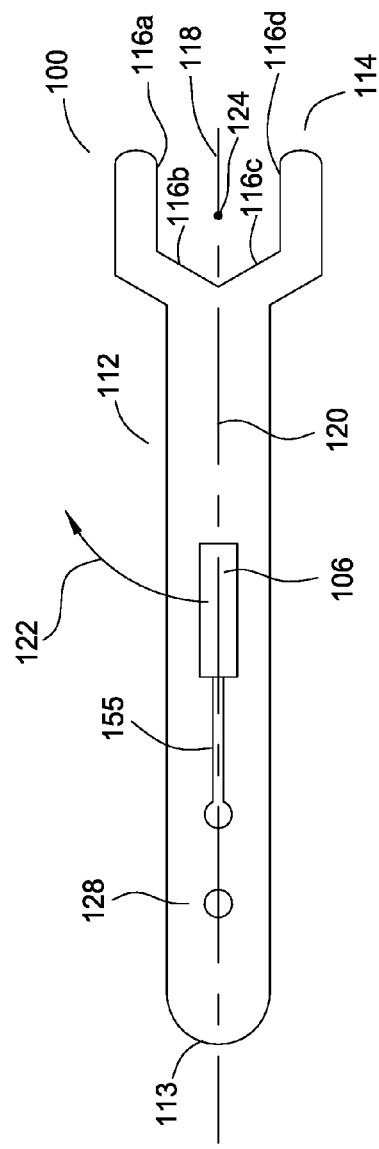
FIG. 9 is a plan view of a portion of the wrench of FIG. 8.
Figure 10:
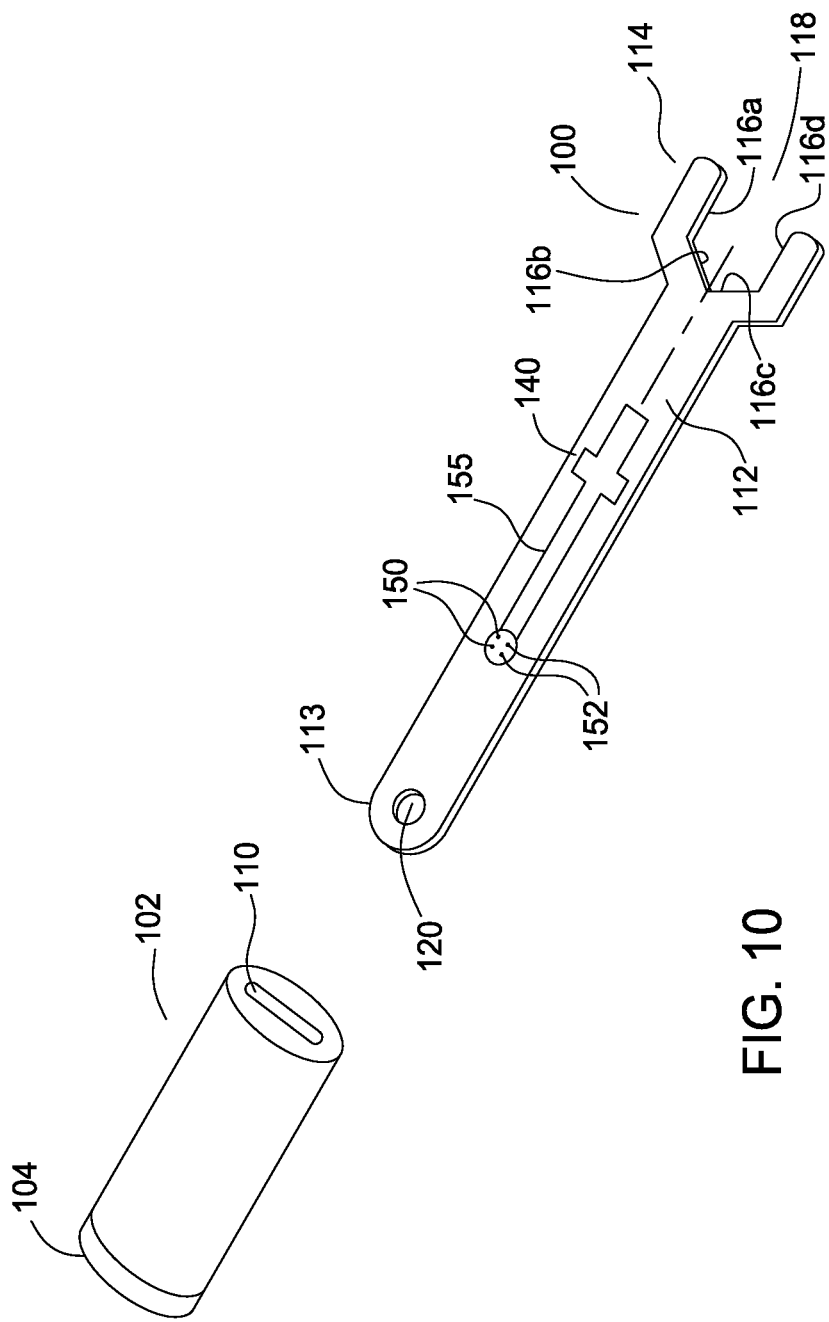
FIG. 10 is an exploded view of the wrench showing the tool portion separated from the handle.

Referring to FIG. 7 an additional connection is shown. In this fitting connection, the first gland 24 and the male nut 22 are replaced with a male plug 88 having the features of both. Male plug 88 includes threads 82 configured to mate with the threads in the bore 30 of female portion 14. Plug 88 includes a hex head nut portion 84, and a shank 86 on which threads 82 are present. At the end of the shank 86 distal from the nut portion 84, a generally flat circular surface includes the circular projection 42 extending therefrom. Gasket 38, which may include a retainer 70, is positioned between the projection 42 on the female portion 14 and the projection 42 on the plug 88. As with the previous two constructs, as the plug 88 and female portion 14 are tightened together, a false finger tight condition can be detected. Using the wrench 60, by detecting when the strain on the handle of the wrench begins to continuously increase using the derivative or second derivative of the strain signal, the beginning point for further rotation of the nut post the "finger tight" condition is established, and proper subsequent turning, and tightening, is accomplished.

Referring now to FIGS. 8 to 11, features of the wrench 60 are shown. Although wrench 60 is shown and described with reference to a two piece wrench having a hex head tool portion, single other multi-piece wrenches, and different tool head configurations, are specifically contemplated. Wrench 60 generally includes a tool portion 100 which is releasably received within slot 110 (FIG. 10) of a handle 102. Tool portion 100 includes a generally planar elongated shaft 112, having a first, rounded, end 113 and an opposed tool end 114 integrally formed therewith. In the embodiment shown in FIGS. 8 to 11, the tool end 114 is configured as an open ended box wrench opening, having four flats 116a-d laid out as adjacent sides of a regular hexagon leaving an opening 118 at the distal end of the tool portion 100. The specific size of the opening 118, and the length of the adjacent flats 116a-d, is configured to specifically fit along the sides of the adjacent flats of a hex head on a nut to be turned with the wrench 60. Additionally, multiple tool portions 100 having different opening sizes and lengths of the adjacent flats 116a-d may be provided, wherein the shaft 112 of each such tool portion 100 is insertable into the slot 110 of the handle 102. For example, a single wrench handle 102 can be used in conjunction with tool portions 100 having different opening 118 sizes and flat 116a-d lengths, such that the wrench 60 can accommodate turning of nuts having different size heads, i.e., shorter or longer adjacent flats laid out in a partial regular hexagon shape. Additionally, a closed end hex structure, wherein all six of the flats of the regular hexagon are provided adjacent the distal end of the shaft 112, or other fastener and nut patterns, in either an open or closed layout, are specifically contemplated for the tool portion.

Shaft 112 of the tool portion further includes a detent opening 128 extending therein or therethrough, into which a spring loaded ball (not shown) extending inwardly of the slot 110 in a region within the body of the handle 102 is received when the tool portion 100 is pushed fully inwardly of the slot 110, to retain the tool portion 100 within the handle 102 during normal use of the wrench 60, but allow a user to pull the tool portion 100 from the slot 110 to allow replacement thereof with a different tool portion 100.

To enable the detection of the condition of the fitting 10 connection of FIG. 1 during make-up thereof and avoid acting on a false perception that the connection has been made "finger tight", strain detector and rotation sensor package 106 is provided on a side of the shaft 112 generally aligned parallel to the centerline 120 of the shaft 112, which centerline is aligned generally parallel to the opposed flats 116a and 116d extending the opening 118 of the tool portion. Thus, as the wrench 60 is used to rotate a nut (or the head of a fastener or other item), the shaft of the tool portion 100, and thus the electronics package 106, swings in an arc 122 centered at the center 124 of the hex or other head pattern of the tool portion. Because the tool portion is inserted inwardly of the handle 102 through the slot 110, as an assembler grips the handle 102 and applies a force in the direction 126, the tool portion 100 will slightly bend and a compressive strain is encountered at first side 130 of the centerline 120 of the shaft 112 of the tool portion 110, and tensile strain will occur in the shaft on a second side 132 of the centerline 120 of the shaft 112 of the tool portion 110. This strain is proportional to the resistance to turning of the nut being turned by the wrench, for example the nuts 22, 28 and 84 of the embodiments. Initially, as the threads of one nut engage the threads of the second nut, the friction along the thread surfaces provides a small resistance to rotation, and thus a small compressive and tensile stress is created in the shaft 112 and is detectable by the, strain detector and rotation sensor package 106. Specifically, in one embodiment, the strain detector and rotation sensor package 106 includes a strain detector 140 spanning to either side 132, 134 of the centerline 120 of the shaft 112 of the tool portion 100, and a gyro sensor 142 integrally formed on a substrate 144 affixed to the side of the shaft 112 generally aligned parallel to the centerline 120 of the shaft 112. Strain detector is configured, in one embodiment, as a pair of strain gauges 146, 148, one of each of which is located on opposed sides of the centerline 120 of the shaft 112 of the tool portion 100. Thus, as the assembler moves the handle 102 in the direction 126, compressive strain is detected at strain gauge 148, and tensile strain is detected at strain gauge 146. These strains generate an electrical signal in the strain gauges 146, 148, which is proportional to the strain of the shaft 112 on opposed sides of the centerline 120, which is communicated via a strap 155 having a plurality of conductive wires embodied therein to two pairs of pickups 150, 152, each pickup dedicated to one of the strain gauges 146, 148. Each pair of pickups 150, 152 is connected, within the handle 102 of the wrench 60, to a contact (not shown), which is connected to a controller 154 (shown in phantom) within the handle 102 by internal handle 156 wiring. The logic chip 154 is, in this embodiment, a programmable logic controller, such as those available from Xylinx or Altera, which is powered by a battery 104 via bus 158. The input from the strain gauges 146, 148 is input to the controller 154, and when the strain is indicative of a properly seated gasket 28 in a connection 10, the controller 154 outputs a signal to cause a signal generator 108 to emit a signal to a user indicating that the connection has reached a point which is considered finger tight. The controller 154 also receives a signal from the gyro, which is, in this embodiment, a MEMS device which can output a signal indicative of the angle of rotation about an axis, in this embodiment, the axis being point 124 relative to the tool body 100. The output of the gyro is monitored by the controller 154 until the desired rotation of the nut after the "finger tight" or fully seated gasket 38 against projections 42 condition has been achieved, i.e., where the further rotation of the nut, after a finger tight or a fully seated gasket 38 against projections 42 condition has been achieved, is ¼ of a turn, the controller 154 monitors the gyro 142 output to determine when the wrench has turned the nut 90 degrees from the point at which the finger tight or fully seated gasket 38 against projections 42 condition was achieved, at which point the controller sends an additional signal to signal generator 108, to indicate to the user (assembler) that the nuts of the connection 10 are properly tightened using for example, light, sound or both. The controller 154 may, alternatively, be placed on the shaft 112 of the tool, such that it is received within the slot 110 when the tool portion 100 is connected to the handle 102, and the output thereof connected to the wiring within the handle 102 for the battery 104 and signal generator 108 via contact pins or other connection paradigms, including wireless connections.

Signal generator 108 may, for example, be a light emitting device, wherein the color or intensity of the light is changeable to indicate to a user when a "finger tight" and "fully tight" connection of the nuts of the connection has been made. The signal generator 108 may optionally only emit a signal when the fully tight condition is achieved. However, by emitting a signal when the finger tight condition is achieved, the user is thus warned that the fully tight condition will soon be reached, and the user can better monitor the signal of the signal generator 108 to prevent overtightening of the nuts even though the fully tight signal is sent from the signal generator 108. The signal generator may also emit audible signals, in the form of tones, changing tones, a repetitive beat, a changing beat between the achievement of the finger tight and fully tight conditions, etc. It may also cause the handle 102 to vibrate, and different vibration frequencies or amplitudes can indicate the finger tight and fully tight condition.

The nuts of a connection may be tightened using two wrenches. In one case, a first wrench is not enabled with a strain detector and rotation sensor package 106, and a second wrench 60 is enabled. In this case, the first wrench is used to hold one nut fixed against rotation, for example male nut 20, and the second wrench 60 is used to turn the second nut, for example female nut 28. However, at times, there may arise a need to turn both the male and female nuts (20, 28), particularly where there is a desire to precisely turn the nuts 20, 28 relative to each other after "hand tightening" is achieved, and it is difficult to hold one of the nuts stationary while turning the other.

Figure 11:
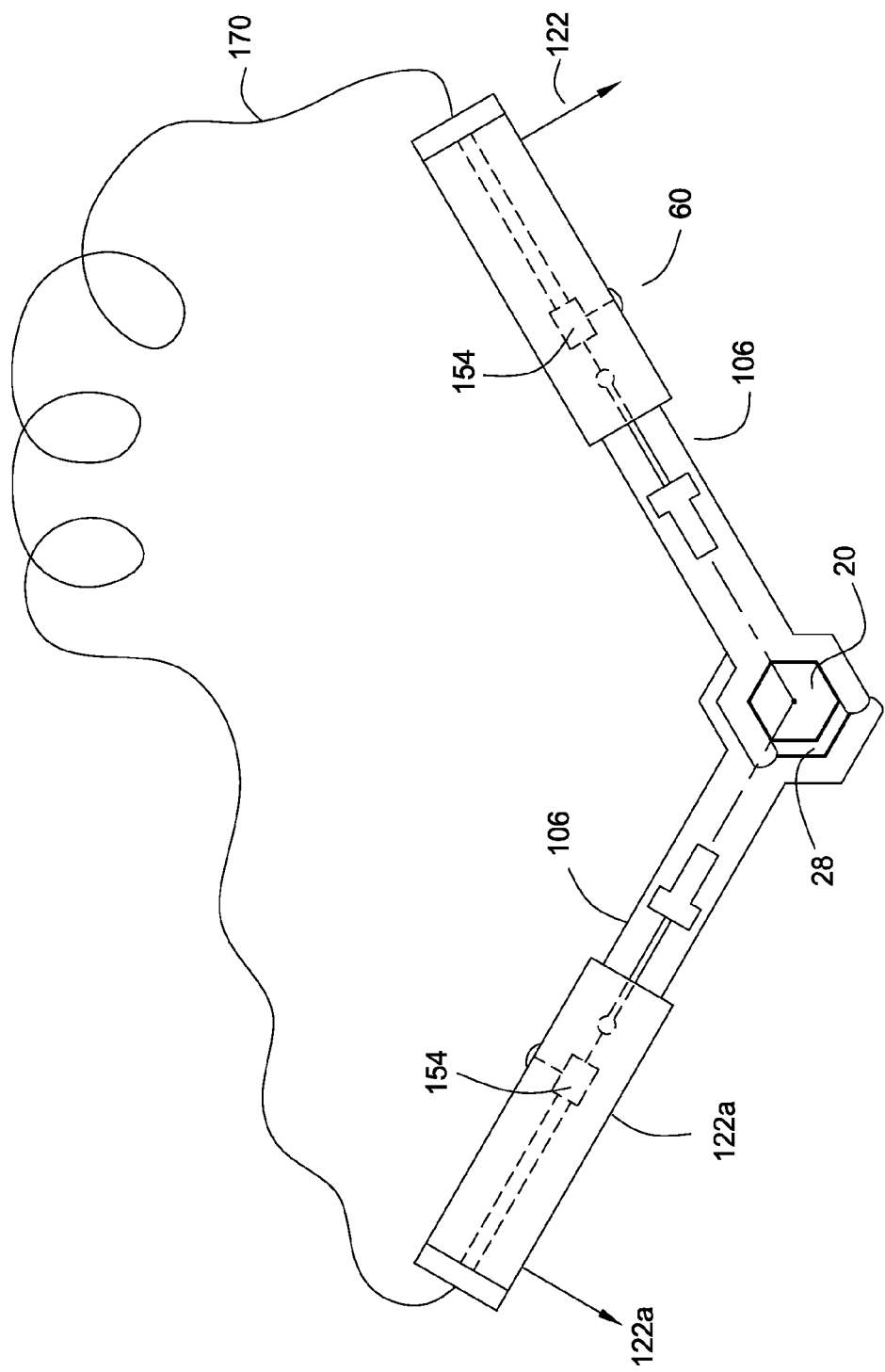
FIG. 11 is a perspective view of two wrenches interconnected for tightening of the fitting connections

As shown in FIG. 11 two wrenches 60, 60a may be used to simultaneously turn, and tighten, the male and female nuts 20, 28. In this embodiment, both of the wrenches 60, 60a are configured with all of the same capabilities, for example with the strain detector and rotation sensor package 106, including the strain gauges, gyro, logic chip 154 and wireless capability, as the wrench 60 shown and described with respect to FIGS. 8 to 10 In use, the wrenches 60, 60a communicate with each other either wirelessly, or via a cable 170 interconnecting the logic chips 154 (FIGS. 8 and 9) thereof, to track and sum the strain on the wrench handles 102 and the handles rotations once the inflection point is or was reached during make-up of the connection. As with the use of a single wrench 60 where the one nut is held stationary, in this embodiment, the sum of the strain on both wrenches 60, 60 as they turn the nuts 20, 28 in directions 122, 122a, and the sum of the rotation after the strain inflection point is determined, is used to determine when the connection is properly made-up and rotation should stop. Thus, the final rotation is a function of relative tuning of the nuts 20, 28 by a specified number of fractions of turns, turns, or degrees after the 'hand tightened" relative position is determined. Summing can be done on one of the two logic chips by passing the signals of strain and rotation from, for example wrench 60, through cable 170, to logic chip 154 in wrench 60. The use of a cable 170 for hard wired signal transmission can be replaced via use of Bluetooth or other wireless signaling. Additionally, where two wrenches are used, the wrenches are best deployed as a mated pair, such that the effect and operation thereof together to tighten the nuts of a connection is known. By having a physical cable between the wrenches, use thereof as mated pairs is most likely to occur. However, each wrench can also have an electronic identity, kept in the logic chip or a memory, which can be wirelessly communicated to another wrench. Additionally, the wrenches may communicate with a separate controller, which receives by hard wire or wireless communication protocols, and monitors, wrench handle strain and rotation, and emits a signal or transmits a signal to at least one of the wrenches to cause the wrench to create a signal to the assembler indicative that the connection is properly tightened. By providing multiple tool portions 100 interchangeable with a handle 102, a tool portion 100 can be calibrated to a specific connection being made. For example, VCR connections being made in a single device being manufactured, such as a gas distribution panel, can include piping of different diameters. A large diameter piping can supply gas or liquid to a distribution point, from which smaller diameter pipings eminate. The size of the nuts, and thus the force 126 needed to turn the nuts, is different on the larger diameter piping than on the smaller diameter piping. Additionally, different connection configurations, or end user specific requirements for the same size piping may have different requirements for the number of turns or portions of a turn to be applied after "finger tightening" is achieved. Thus, different tool portions 100, including those having different sized openings 118 and flat 116a-d lengths, may thus calibrated for a specific fitting connection in equipment destined for a specific end user or customer.

Table 1 demonstrates the use of different tool portions 100 with the same handle 102 during assembly of fluid connections for equipment destined for different end users or customers using the wrench 60 of the embodiments herein.

TABLE 1

| End User | Piping diameter | Post finger tight turns |
|---|---|---|
| A | 1 inch | 1/4 |
| B | 1 inch | 3/8 |
| A | 1/2 inch | 3/16 |

TABLE 1-continued

| End User | Piping diameter | Post finger tight turns |
|---|---|---|
| B | 1/2 inch | 1/2 |
| C | 1/4 inch | 3/16 |
| A | 1/4 inch | 1/4 |
| C | 3/8 inch | 1/4 |
| A | 3/8 inch | 1/4 |

As shown in the above Table 1, for the same connection size, i.e., the connection piping of the same diameter using the same connection components, different end users, for example different customers buying the equipment, will have different requirements for the number (of fraction of the number) of turns of the nuts after achieving the "finger tight" condition. To address this, each tool portion 100 can be calibrated, and the calibrated identity thereof to a specific connection can either be read by the controller 154 to associate the tool portion 100 to a specific user and piping (connection size) or by locating the logic controller 154 directly on the shaft 112 of the tool portion and associating the tool portion 100 to a specific user and piping (connection size) directly in the controller 154.

To calibrate each tool portion 100 to a specific fitting connection size and internal component configuration, the assembler or wrench 60 user may tighten a number of fitting 10 connections, and in so doing record a number of strain gauge outputs with respect to the connection. From those outputs, the assembler can determine the strain during running together of the nuts, i.e., before reaching the finger tight condition, the change in strain (derivative or second derivative) indicative of a false "finger tightened" condition, and the change in strain (derivative or second derivative) indicative of tightening of the nuts after they are hind tightened, i.e., after the gasket is fully seated against the projection 42 on both glands 24, 34. These strain values are then programmed into the programmable controller 154 in association with the identity of the specific tool portion 100. Additionally, the tool portion 100 may be dedicated to connections made for a specific end user or customer. In this case, the number (or fraction) of rotations of the nuts after the "finger tight" or fully seated gasket 38 condition is achieved is also programmed into the programmable controller in association with the identity of the specific tool portion 100. Where the programmable controller 154 is configured in the handle of the wrench 60, an indicia of the end user (customer) and connection size, is embedded in the tool portion 100. Thus, for example an RFID tag readable by an RFID reader associated with the controller 154 provided in the handle 102 may be employed, wherein the strain calibration and post "finger tightened" or gasket fully seated number of turns conditions, are stored in the programmable controller 154 in association with the RFID identity of the tool portion 100. In this way, multiple tool portions 100 can used in conjunction with a single handle 102, where the tool portions can each be associated with the requirements of a specific end user of the manufactured equipment for a specific connection.

Although the previous embodiments hereof evaluate the change in strain on the tool handle, in another embodiment, the stress in the tool handle 102 can be used as an indicator of correct connection make up. In this embodiment, the strain and change in strain need not be monitored, and instead, the stress on the handle, indicative of a properly made up connection, is employed to declare a properly made up connection. After properly seating a plurality of glands 24, 34 and gasket 38 connection and turning them by the required number of full or partial turns, and measuring the stress in the handle at the end of the additional turn(s), and average stress indicative of a properly made up connection is established. As multiple fitting sizes, nut sizes, etc., will have different characteristics, this need be repeated for each fitting size and combination being used, or when a new fitting is being deployed. Thereafter, there is no need to look at "finger tight" condition followed by the required number of turn(s), because the final stress, which is higher than that needed to bring the glands into alignment using the old finger tight standard when a false finger tight condition occurred, indicates proper make-up of the connection and relative compression of the glands 24, 34 and the gasket 38 surfaces.

Additionally, one may measure the strain on the gasket as the connection is tightened for a number of connections of the same size and configuration, and calibrate that characteristics of the strain as the connection achieves the fully made up and the "finger tight" condition, and use that strain output to correctly make up the fitting. In this embodiment, a strain gauge and wireless communication device are located on or in a non-projection 42 contacting region of the gasket. The strain on the gasket is measured as the nuts 20, 28 are being tightened, and a previously determined indicated strain curve derivative or second derivative is used to determine the point at which the connection has achieved full contact between the projections 42 on the glands 24, 34 and the gasket.

In each embodiment hereof, the data associated with each fitting connection, including strain curves, stress curves, number of total turns and turns after proper engagement of the gasket and glands was established, as well as additional information such as time, date and assembler. The data is acquired either directly from the wrench to a system controller, and can be directly uploaded therefrom to an internal assembly manufacturer, customer, or ultimate end user, database While the foregoing is directed to embodiments of the present invention, other and further embodiments of the invention may be devised without departing from the basic scope thereof, and the scope thereof is determined by the claims that follow.

The invention claimed is:

1. A method of making up a fluid tight threaded connection without overtightening the components of the connection, comprising:
   inserting a male threaded portion having a first sealing gland associated therewith into a female threaded portion having a second sealing gland associated therewith;
   turning at least one of the male threaded and female threaded portions with respect to the other using a wrench;
   monitoring the strain on the body of the wrench and determining when the first and the second sealing glands have come into full contact with one another; and
   continuing to turn the at least one of the male threaded and female threaded portions with respect to the other using the wrench by a user specified number of turns or fractions thereof.

2. The method of claim 1, wherein the user specified number of turns is specified in degrees of rotation.

3. The method of claim 1, further comprising monitoring the amount of rotation of the at least one of the male threaded and female threaded portions with respect to the other with the wrench.

4. The method of claim 3, wherein the amount of rotation is monitored by processing a signal from a gyro provided integrally with the wrench.

5. The method of claim 1, wherein the wrench includes a handle and a first tool portion, and replacing the first tool portion of the wrench with a second tool portion.

6. The method of claim 5, wherein the first tool portion and the second tool portions are calibrated to a specific fitting size.

7. The method of claim 5, wherein the first tool portion and the second tool portion are associated with the making up of a threaded connection for a specific end user.

8. The method of claim 1, wherein one of the first and second sealing glands includes a gasket therein, and when the when the first and the second sealing glands have come into full contact with one another, the gasket is fully contacted to a sealing feature on the other of the first and second sealing glands.

* * * * *